United States Patent [19]
Mazza

[11] 3,799,558
[45] Mar. 26, 1974

[54] POSITIONING DEVICE FOR THE PICK-UP ARM OF A RECORD PLAYER

[75] Inventor: Lamberto Mazza, Pordenone, Italy

[73] Assignee: Industrie A. Zanussi S.p.A., Pordenone, Italy

[22] Filed: Jan. 10, 1972

[21] Appl. No.: 216,662

[30] Foreign Application Priority Data

Jan. 16, 1971 Italy ................................ 20512/71

[52] U.S. Cl. ................................................ 274/13 R
[51] Int. Cl. ........................................... G11b 21/12
[58] Field of Search .............. 274/9 B, 14, 23 B, 15, 274/21, 13, 4 H, 22

[56] References Cited

UNITED STATES PATENTS

| | | | |
|---|---|---|---|
| 1,860,104 | 5/1932 | Larsen | 274/13 R |
| 1,992,575 | 2/1935 | Johnson | 274/21 |
| 2,028,224 | 1/1936 | Langley | 274/21 |
| 3,536,331 | 10/1970 | Goldmark | 274/23 R X |
| 3,622,163 | 11/1971 | Bachman | 274/23 A X |

*Primary Examiner*—Louis R. Prince
*Assistant Examiner*—Charles E. Phillips
*Attorney, Agent, or Firm*—Holman & Stern

[57] ABSTRACT

A pick-up arm positioning mechanism for a record player in which a shaft is placed diametrically over the record to be played, with two wheels being idly rotatable on opposite ends of the shaft with respect to the center of the record and rest thereon. A screw-threaded arbor engages a surface of a portion of the pick-up arm between a position of engagement and a disengaged position, with means being provided for transferring the rotary drive alternatively from either wheel to the screw-threaded arbor. An advantageus connection between the screw-threaded arbor and the pick-up arm is a deformable surface, such as a velvet-like fabric.

5 Claims, 5 Drawing Figures

PATENTED MAR 26 1974 3,799,558

SHEET 1 OF 3

POSITIONING DEVICE FOR THE PICK-UP ARM OF A RECORD PLAYER

BACKGROUND OF THE INVENTION

When playing phonograph records, the necessity often arises for placing the needle in a position which is intermediate in the record, so as to listen to a determined portion of the record; this occurs, for example, when it is desired to listen many times to a portion of the record without having access every time to the start of the record.

The positioning of the needle as carried by the arm onto an intermediate groove of the record is, at any rate, an extremely difficult operation since an inadvertent movement may damage the record: it is always inadvisable to perform such an operation manually. In addition, when the type is of the automatic record player fitted with a slot, that is the casing has only a slot through which the record is introduced, the direct manual actuation of the pick-up arm is impossible.

OBJECTS AND SUMMARY OF THE INVENTION

The device according to the present invention allows the pick-up arm to be positioned in any preselected location, and has such provisions that the arm actuating means are the same which drive the record to rotation, the assembly having thus both an economical and constructionally simple nature.

According to the present invention, the device comprises a shaft, arranged diametrically with respect to the record driven to rotation, two idle wheels rotating on said shaft and resting against the record, each on a side with respect to the center of the record, a screw-threaded arbor driven so as to be moved between a position of engagement of the screw-threaded portion with said arm, and an idle position, and means for transferring the rotary drive alternatively from either of said two wheels to said arbor.

The means which transfer the rotary drive from the wheels to the pin consist, with advantage, of a sleeve which freely slides on the shaft carrying said wheels, in the position comprised therebetween; the sleeve carries at its ends front teeth to which correspond front teeth which are affixed to each wheel; the sleeve can thus be urged alternatively so as to become connected with either wheel and is connected to the screw-threaded arbor, for example by means of a belt.

The threaded arbor, as it is positioned so as to engage its screw-thread with the pick-up arm, lifts the arm so that the needle is lifted from the record and can go through a translational movement having a radial component with respect to the record, so as not to damage the grooves thereof. An appropriate connection between the screw-threaded arbor and the arm has proven to be a mere deformable surface inserted between the arbor and the arm. As a matter of fact, the latter, by resting with its proper weight on the arbor causes that surface to take the shape of a screw-thread and the rotation of the arbor causes the surface to slide therealong concurrently with the arm.

Further advantages and features of the positioning device according to this invention will become clearer from the ensuing description of an exemplary embodiment of the device, as illustrated in the accompanying drawings, wherein:

DETAILED DESCRIPTION OF THE INVENTION

Figure 1:
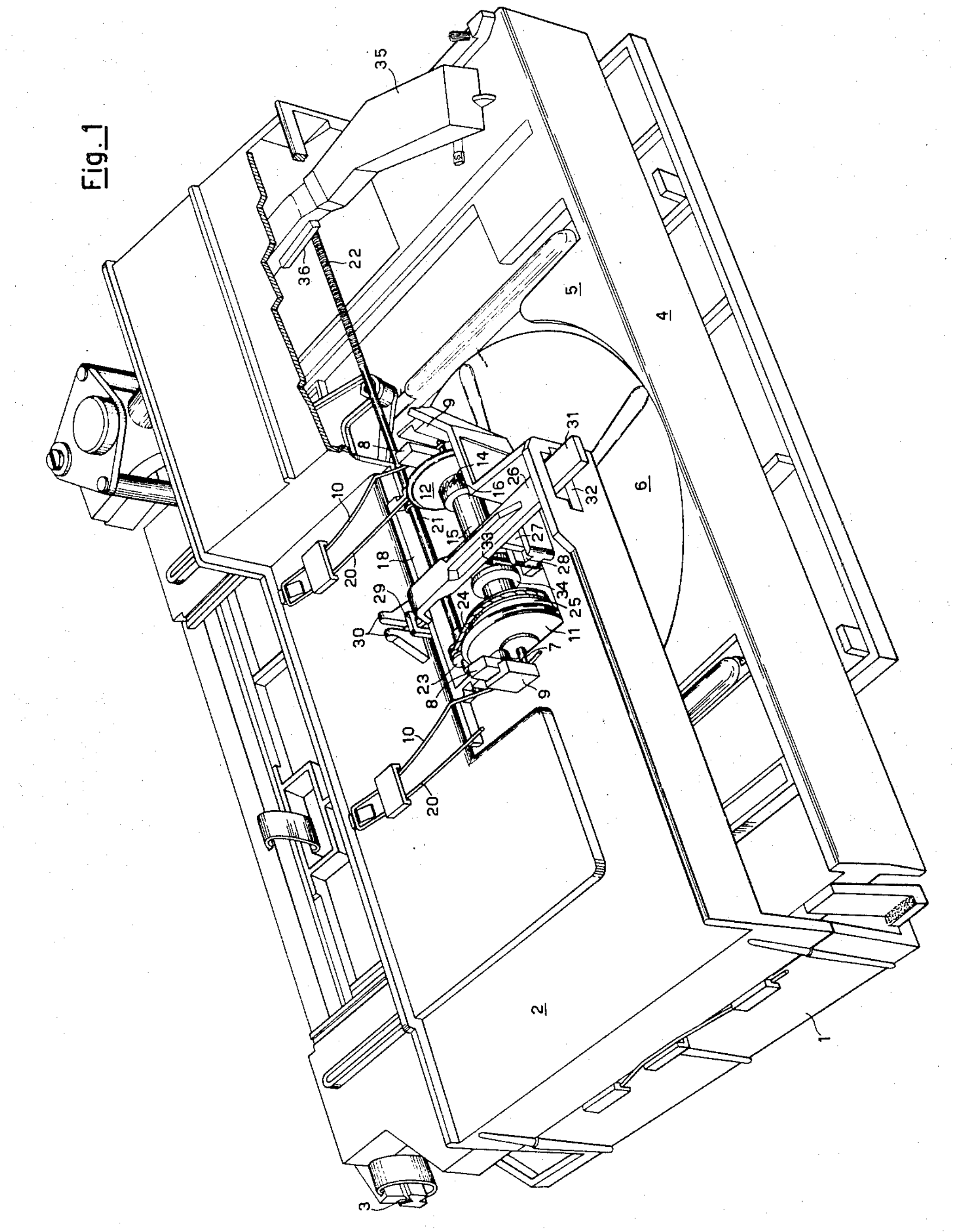
FIG. 1 is a diagrammatical perspective view, partly in section, of a record-player on which the device according to the present invention has been installed.
Figure 2:
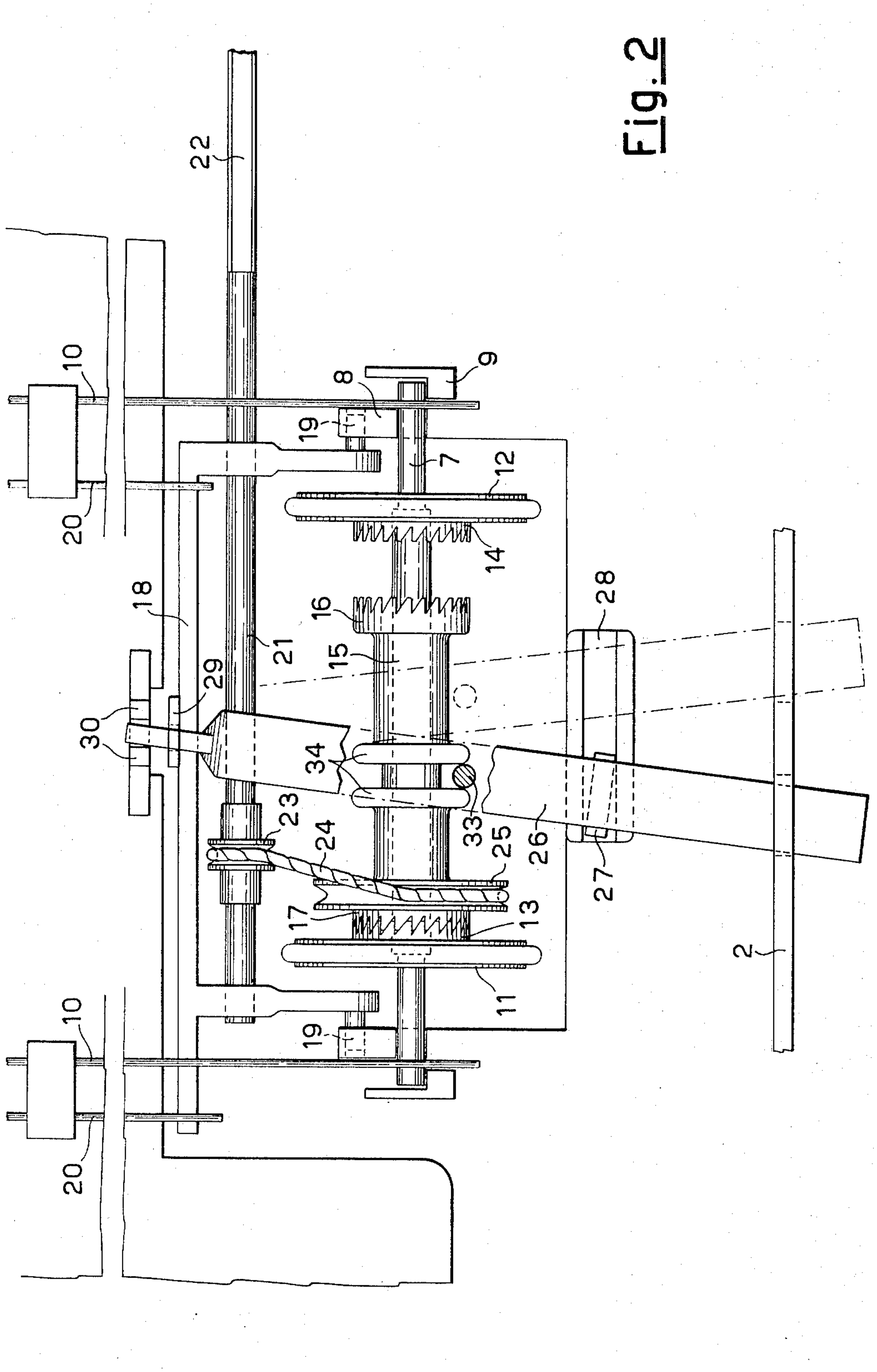
FIG. 2 is a partial plan view of the record-player shown in FIG. 1, in another position.

With reference to FIGS. 1 and 2, the record-player casing consists of a fixed bottom wall 1 and an upper portion 2 integral therewith. To the bottom wall 1 is hingedly affixed a movable portion 4 which can be swung between a lifted position, as shown in the drawing, and a depressed position, not shown, in which top plane 5 of the portion 4 is at a level below a turntable 6.

On the portion 2, between projecting blocks 8 and 9 at each end, a shaft 7 is housed and is allowed to move in a vertical plane against the bias of springs 10 which urge it downwards.

On the shaft 7 are mounted, in an axially fixed manner but freely rotatable, wheels 11 and 12, which carry on the confronting surfaces, front teeth, 13 and 14, respectively. On the shaft between the idle wheels there is also, mounted in an axially free and rotatable manner, a sleeve 15 (which is terminated at both ends) with front teeth 16 and 17. A frame 18 is pivoted at 19 to the blocks 8 and is swingable against the bias of springs 20, and there is, rotatable and axially fixed thereon, an arbor 21 which carries a screw-threaded portion 22. To the arbor 21 is keyed a sheave 23 connected by a stretchable belt 24 to a sheave 25 keyed to the sleeve 15. A lever 26 rests with an extension 27 on a groove 28 solid with the portion 2 and is extended so as to pass through a bridge 29 of the frame 18 and then through a fork 30 which is also integral with the portion 2. An end 31 of the lever 26 passes through a slot 32, which limits and governs the movement of the lever. The lever 26 also carries a pin 33 which is housed between two extensions 34 of the sleeve 15.

The operation of the record-player now described will be described in the following: when the movable portion 4 is lifted, as shown in FIG. 1, a record 36 is laid on the surface 5 in correspondence with the turntable 6, possibly through a slot formed in a cabinet surrounding the record player, the cabinet being not shown herein.

Figure 3:
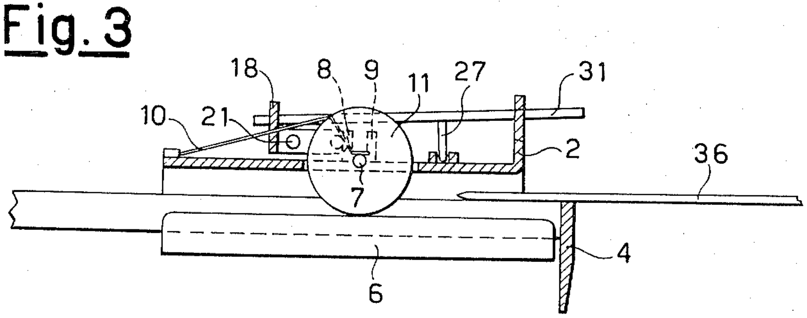
FIG. 3 is a view partly in elevation and partly in cross-section of one of the wheels and associated parts and shows the record-player before the introduction of a record.
Figure 4:
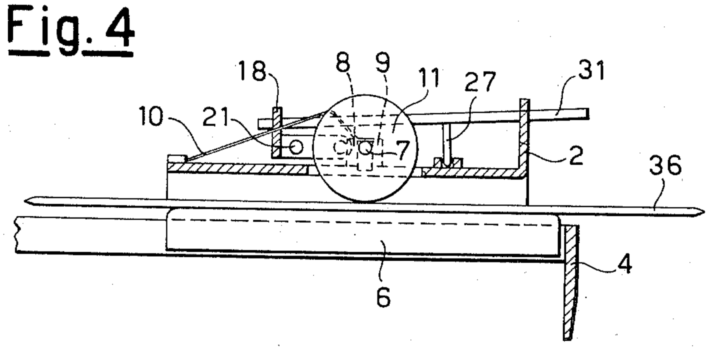
FIGS. 4 and 5 are views similar to FIG. 3 of subsequent stages of the introduction of a record in the machine.
Figure 5:
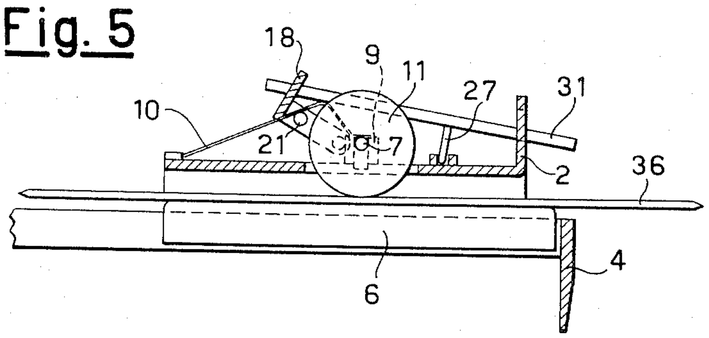

The positioning of the record 36 takes place according to the sequence shown in FIGS. 3, 4 and 5, by sliding on the surface 5; the record lifts in this movement, the wheels 11 and 12 against the bias of the springs 10. Then, either manually or automatically, the portion 4 is lowered and the record is laid on the turntable 6 and an arm 35 is placed on the record. During playing, a deformable surface 36, for example of velvet, is in a lifted position and in registry with respect to the screw-threaded portion 22 of the arbor 21. To vary the position of the arm over the record, the lever 26 is pushed downwards by depressing the end 31 and shifting it towards the right or the left: as a result, the sleeve 15 will be rotated by the corresponding wheel (due to the intermeshing of the teeth), and will transmit its rotation to the arbor 21. At the same time, by depressing the lever 26, the arbor 21 is lifted thus engaging and lifting the tone arm 35 by the engagement of the screw threaded portion 22 with the deformable surface 36. Since the arbor 21 is still rotating, the tone arm will be shifted, as the deformable surface 36 functions as a ratchet, either toward the center or toward the outer periphery of the record. Upon the desired position of the pick-up arm being reached, it is merely necessary to release the end 31 of the lever 26.

On considering that in this figure the record, not shown, placed on the turntable 6, rotates in a clockwise direction, the two wheels 11 and 12 which rest thereon, are each rotated in a direction contrary to that of the other one, so that, by shifting either towards the right or towards the left, a rotary drive is transferred to the sleeve, and thus to the arbor 21, in either direction; thus, also the arm 35 will be enabled to be shifted in either an outward or inward direction with respect to the record so as to become positioned in the desired record area.

In the particular embodiment shown, the movement of a movable portion 4 provides to lay a record on the turntable, but the device according to this invention can be applied, with quite a similar configuration, to a conventional record player in which the record is directly slipped over the turntable, or also in which the turntable, with an axial movement, carries the record after having drawn it from a resting surface.

It can be noted, at last, that the wheels 11 and 12 are advantageously equipped along their rest surface with a ring of rubber or other soft material so as to have a fair adhesion without spoiling the surface of the record on which they roll, both during the initial positioning and in operation, when they, however, will be preferably caused to roll on the non-grooved central surface of the record.

The device described above provides, as outlined in the foregoing, the lifting and depression of the arm in a virtually vertical direction, so that no risk of damage of the record is encountered, as caused by the needle carried by the pick-up arm, with said needle being placed in the grooves of the record. In order to prevent damage to the record with an increased margin of safety, damping means for the depressional movement of the arm can be provided in a conventional manner, so as to have the arm placed on the record surface without bumping.

What is claimed is:

1. A device for positioning a pick-up arm of a record player, comprising a support, a turntable on which a record rests mounted on the support, a pick-up arm having a needle, means mounting the pick-up arm on the support for pivotal movement over the turntable, a shaft mounted on the support above the turntable, two wheels mounted on the shaft for idle rotation relative thereto, with one wheel being located on each side of the center of the record and engaging the record for being rotated by the record, a substantially horizontal arbor, means mounting the arbor in spaced relation to the shaft for rotary and pivotal movement toward and away from the pick-up arm, said arbor having a screw-threaded portion which engages the pick-up arm when the arbor is pivoted toward the pick-up arm, and means for transferring a rotary drive alternatively of either wheel to the arbor.

2. The positioning device as claimed in claim 1, in which a sleeve is axially slidable on the shaft between the wheels, the sleeve having at each end teeth which correspond to teeth affixed to the wheels, so that the sleeve is driven to axial sliding or being alternatively connected therewith, and a rotary drive transfer mechanism connecting the sleeve to the arbor.

3. The positioning device as claimed in claim 2, in which the rotary drive transfer mechanism includes a sheave on the arbor, a sheave on the shaft and a belt trained around the sheaves.

4. The positioning device as claimed in claim 1, in which the pick-up arm is provided with a deformable surface for engagement by the screw-threaded portion of the arbor, with the deformable surface shaping itself to constitute a complementary screw-threaded portion.

5. The positioning device as claimed in claim 4, in which said deformable surface is a velvet-type fabric.

* * * * *